US008711864B1

(12) United States Patent
Ko

(10) Patent No.: US 8,711,864 B1
(45) Date of Patent: Apr. 29, 2014

(54) SYSTEM AND METHOD FOR SUPPORTING FIBRE CHANNEL OVER ETHERNET COMMUNICATION

(75) Inventor: Michael Ko, San Jose, CA (US)

(73) Assignee: Chengdu Huawei Symantec Technologies Co., Ltd., Chengdu (CN)

( * ) Notice: Subject to any disclaimer, the term of this patent is extended or adjusted under 35 U.S.C. 154(b) by 878 days.

(21) Appl. No.: 12/750,281

(22) Filed: Mar. 30, 2010

(51) Int. Cl.
H04L 12/28 (2006.01)
H04L 12/56 (2011.01)

(52) U.S. Cl.
USPC ...... 370/395.53; 370/381; 370/389; 370/397; 709/221

(58) Field of Classification Search
USPC .............. 370/389, 395, 395.53, 401
See application file for complete search history.

(56) References Cited

U.S. PATENT DOCUMENTS

| 6,085,200 | A  | 7/2000  | Hill |
| 6,253,240 | B1 | 6/2001  | Axber |
| 6,347,342 | B1 | 2/2002  | Marcos |
| 6,353,612 | B1 | 3/2002  | Zhu |
| 6,389,432 | B1 | 5/2002  | Pothapragada |
| 6,400,730 | B1 | 6/2002  | Latif |
| 6,601,187 | B1 | 7/2003  | Sicola |
| 6,606,690 | B2 | 8/2003  | Padovano |
| 6,636,239 | B1 | 10/2003 | Arquie |
| 6,640,278 | B1 | 10/2003 | Nolan |
| 6,654,747 | B1 | 11/2003 | Van Huben |
| 6,671,776 | B1 | 12/2003 | DeKoning |
| 6,697,924 | B2 | 2/2004  | Swank |
| 6,714,952 | B2 | 3/2004  | Dunham |
| 6,738,821 | B1 | 5/2004  | Wilson |
| 6,769,022 | B1 | 7/2004  | DeKoning |
| 6,807,181 | B1 | 10/2004 | Weschler |
| 6,826,580 | B2 | 11/2004 | Harris |
| 6,839,750 | B1 | 1/2005  | Bauer |
| 6,854,035 | B2 | 2/2005  | Dunham |
| 6,920,494 | B2 | 7/2005  | Heitman |
| 6,944,654 | B1 | 9/2005  | Murphy |
| 6,947,939 | B2 | 9/2005  | Fujibayashi |
| 6,959,373 | B2 | 10/2005 | Testardi |
| 6,971,044 | B2 | 11/2005 | Geng |

(Continued)

OTHER PUBLICATIONS

"QLDIRECT QLogic Optimizing and Multipath Driver for Windows NT V4.0 and Windows 2000," (5 Pages), 2000.

(Continued)

Primary Examiner — Edan Orgad
Assistant Examiner — Emmanuel Maglo
(74) Attorney, Agent, or Firm — Leydig, Voit & Mayer, Ltd.

(57) ABSTRACT

A system and method for transmitting packets over two different network protocols without protocol conversion in any switches. A computer system comprises host computers and target storage arrays, or targets, coupled to one another through a Enhanced Ethernet network. Each of the host computers and the targets is configured to transmit encapsulated packets, such as a Fiber Channel over Ethernet (FCoE) packet. During system configuration, each of the targets is set to be the only target included in a virtual local area network (VLAN) with a corresponding unique VLAN identifier (ID). A given host computer logins to multiple assigned targets using a predefined Fiber Channel protocol. In response to a login request, a corresponding target assigns and conveys a N_Port ID that comprises a VLAN ID and a unique Host ID to the host computer in a reply message. A virtual link is established between the host computer and the target storage array.

20 Claims, 7 Drawing Sheets

(56) References Cited

U.S. PATENT DOCUMENTS

| | | | |
|---|---|---|---|
| 7,003,567 | B2 | 2/2006 | Suzuki |
| 7,103,626 | B1 | 9/2006 | Recio |
| 7,161,935 | B2 | 1/2007 | Alonso |
| 7,194,538 | B1 | 3/2007 | Rabe |
| 7,330,897 | B2 | 2/2008 | Baldwin |
| 7,885,256 | B1 | 2/2011 | Yenamandra et al. |
| 7,925,758 | B1 | 4/2011 | Bridge |
| 8,134,918 | B2 * | 3/2012 | Berman .................... 370/222 |
| 8,218,571 | B2 * | 7/2012 | Carlson et al. ............ 370/466 |
| 8,270,420 | B2 * | 9/2012 | Wang et al. ............... 370/401 |
| 8,369,347 | B2 * | 2/2013 | Xiong et al. .............. 370/401 |
| 8,402,166 | B2 * | 3/2013 | Carlson et al. ............ 709/245 |
| 8,422,359 | B2 * | 4/2013 | Nakajima ................. 370/217 |
| 2001/0054093 | A1 | 12/2001 | Iwatani |
| 2002/0095602 | A1 | 7/2002 | Pherson |
| 2002/0099914 | A1 | 7/2002 | Matsunami |
| 2002/0161871 | A1 | 10/2002 | Shanthaveeraiah |
| 2002/0194407 | A1 | 12/2002 | Kim |
| 2003/0026267 | A1 * | 2/2003 | Oberman et al. .......... 370/397 |
| 2003/0084076 | A1 | 5/2003 | Sekiguchi |
| 2003/0085914 | A1 | 5/2003 | Takaoka |
| 2003/0105830 | A1 | 6/2003 | Pham |
| 2003/0118053 | A1 * | 6/2003 | Edsall et al. .............. 370/474 |
| 2003/0130821 | A1 | 7/2003 | Anslow |
| 2003/0140128 | A1 | 7/2003 | Cox |
| 2003/0154267 | A1 | 8/2003 | Comacho |
| 2003/0154268 | A1 | 8/2003 | Sato |
| 2003/0204701 | A1 | 10/2003 | Mimatsu |
| 2003/0208589 | A1 | 11/2003 | Yamamoto |
| 2003/0220991 | A1 | 11/2003 | Soejima |
| 2003/0225993 | A1 | 12/2003 | Yagisawa |
| 2004/0006612 | A1 | 1/2004 | Jibbe |
| 2004/0022200 | A1 | 2/2004 | Grabauskas |
| 2004/0024863 | A1 | 2/2004 | Connor |
| 2004/0025166 | A1 | 2/2004 | Adlung |
| 2005/0036499 | A1 * | 2/2005 | Dutt et al. ................ 370/401 |
| 2009/0092141 | A1 * | 4/2009 | Banerjee .................. 370/397 |
| 2009/0094354 | A1 * | 4/2009 | Rastogi et al. ............ 709/221 |
| 2010/0097941 | A1 * | 4/2010 | Carlson et al. ............ 370/245 |
| 2011/0032933 | A1 * | 2/2011 | Eisenhauer et al. ........ 370/389 |
| 2012/0207177 | A1 * | 8/2012 | Sharma et al. ............ 370/419 |

OTHER PUBLICATIONS

"QLogic Software Suite Streamlines SAN Management," FCIA Member Company Press Release, Nov. 9, 1999, (3 Pages).

"The Architecture of Veritas SANPoint Control tm 2.0," Veritas Software Corporation, 2001, (42 Pages).

High Availability Storage Networks with the Cisco MDS 9500 Series of Multilayer Directors, Cisco Systems, Aug. 2002, (14 pages).

Scott Lukes, "Building Bulletproof Security When Connecting SANs over WANs, while maintaining gigabit speeds, presents challenges," InfoStor, Mar. 2002, (7 pages).

StorageWorks Fibre Channel SAN Switch 16-EL, Compaq, Mar. 21, 2002, (6 pages).

"Ethernet Fabric Requirements for FCoE in the Data Center"; Gary Lee; Ethernet Technology Summit; San Jose, CA; Feb. 2010 (14 pgs).

"FCoE-Presentation"; T11/07-304v0 (Specification in T11/07-303v0); Claudio DeSanti, et al.; 2007 (56 pgs.).

"FC-BB-5 FCoE Models"; T11/07-560v1; DeSanti, et al.; Oct. 2007 (9 pgs.).

* cited by examiner

SYSTEM AND METHOD FOR SUPPORTING FIBRE CHANNEL OVER ETHERNET COMMUNICATION

BACKGROUND OF THE INVENTION

1. Field of the Invention

This invention relates to computer networks and, more particularly, to transmitting packets over two different network protocols without protocol conversion in any switches.

2. Description of the Related Art

As computer memory storage and data bandwidth increase, so does the amount and complexity of data that business and industry daily manage. Businesses typically rely on data centers to run many operations. A data center generally includes client or host computers interconnected by one or more networks. The host computers increasingly share one or more data storage subsystems via the one or more networks. If any portion of the data center has poor performance or becomes unavailable, company operations may be impaired or stopped completely. A data center must therefore keep high standards for assuring the integrity and functionality of its hosted computer environment.

A data center may utilize two or more different network protocols for different benefits and purposes. For example, a business may use an Ethernet protocol when end-users need to transfer relatively small amounts of information over both local and global distances or in clustered, low-latency compute environments. The same business may use a Fibre Channel (FC) protocol for storage area networks (SANs). A FC network protocol is generally implemented when a business accesses a large amount of information for booting over SANs, mail servers, file servers and large databases. In addition, server virtualization is increasingly used in data centers. The demand for Fibre Channel in this case is driven by the need for hypervisors to provide guest operating systems with virtualized storage, accessible through a Fibre Channel network infrastructure.

In order to take advantage of both network protocols, host computers or servers utilize multiple ports on one or more network interface cards (NICs) to interface with an Ethernet network and utilize multiple ports on one or more host bus adapter (HBAs) to interface with a FC network. The complexity of adapter configurations and the number of cables both increase as the processor performance increases. In response, the InterNational Committee for Information Technology Standards (INCITS) published a standard known as the Fibre Channel Backbone—5 (FC-BB-5). This standard enables the consolidation of both FC SANs and Ethernet traffic onto one common network adapter in an attempt to reduce the growing number of adapters required. This standard utilizes a network protocol referred to as Fibre Channel over Ethernet (FCoE) that maps the Fibre Channel protocol natively over the Ethernet protocol.

Current FCoE deployments consist of Converged Network Adapters (CNAs) on host computers and (FCoE) Forwarders (FCFs) in a network. A FCF operates as an Ethernet switch able to operate also as a FC switch. A transmitted FCoE packet between an initiator and a FCF in the FC-BB-5 standard is an Ethernet packet with an encapsulated FC packet. The FCF is responsible for encapsulating and decapsulating FC and FCoE packets between an initiator and a target storage array in a FC SAN. Each initiator interfaces with an FCF in the FC-BB-5 standard, which creates a network traffic bottleneck. Proposed solutions call for changes in the initiator and/or the FCF to provide new functionality. However, these changes both impact currently deployed FCoE initiators that adhere to the existing FC-BB-5 standard and/or utilize an expensive new FCF.

In view of the above, systems and methods for transmitting packets over two different network protocols without protocol conversion in any switches are desired.

SUMMARY OF THE INVENTION

Various embodiments of a computer system and methods for transmitting packets over two different network protocols without protocol conversion in any switches are disclosed.

In one embodiment, a computer system comprises a plurality of host computers coupled to one another through an Enhanced Ethernet network. In addition, a plurality of target storage arrays is coupled to the network. Each of the host computers and the target storage arrays is configured to transmit encapsulated packets, such as a Fibre Channel over Ethernet (FCoE) packet. During system configuration, each of the target storage arrays is set to be the only target storage array included in a virtual local area network (VLAN) with a corresponding unique VLAN identifier (ID). A given host computer performs a login procedure according to a predefined Fibre Channel protocol with one or more assigned target storage arrays. In response to the received login message, a corresponding target storage array assigns a N_Port ID to the host computer in a reply message. The N_Port ID comprises a corresponding VLAN ID of the target storage array and a generated unique host ID. A virtual link is established between the host computer and the target storage array after the login procedure. The virtual link provides an end-to-end communication between the host computer and the target storage array.

In addition, the target storage array is configured to decapsulate a received FCoE packet from a host computer prior to accessing included storage devices. The FCoE packet contains the FC ID. The target storage array uses Fibre Channel protocol for accessing the storage devices.

These and other embodiments will become apparent upon consideration of the following description and accompanying drawings.

Figure 1:
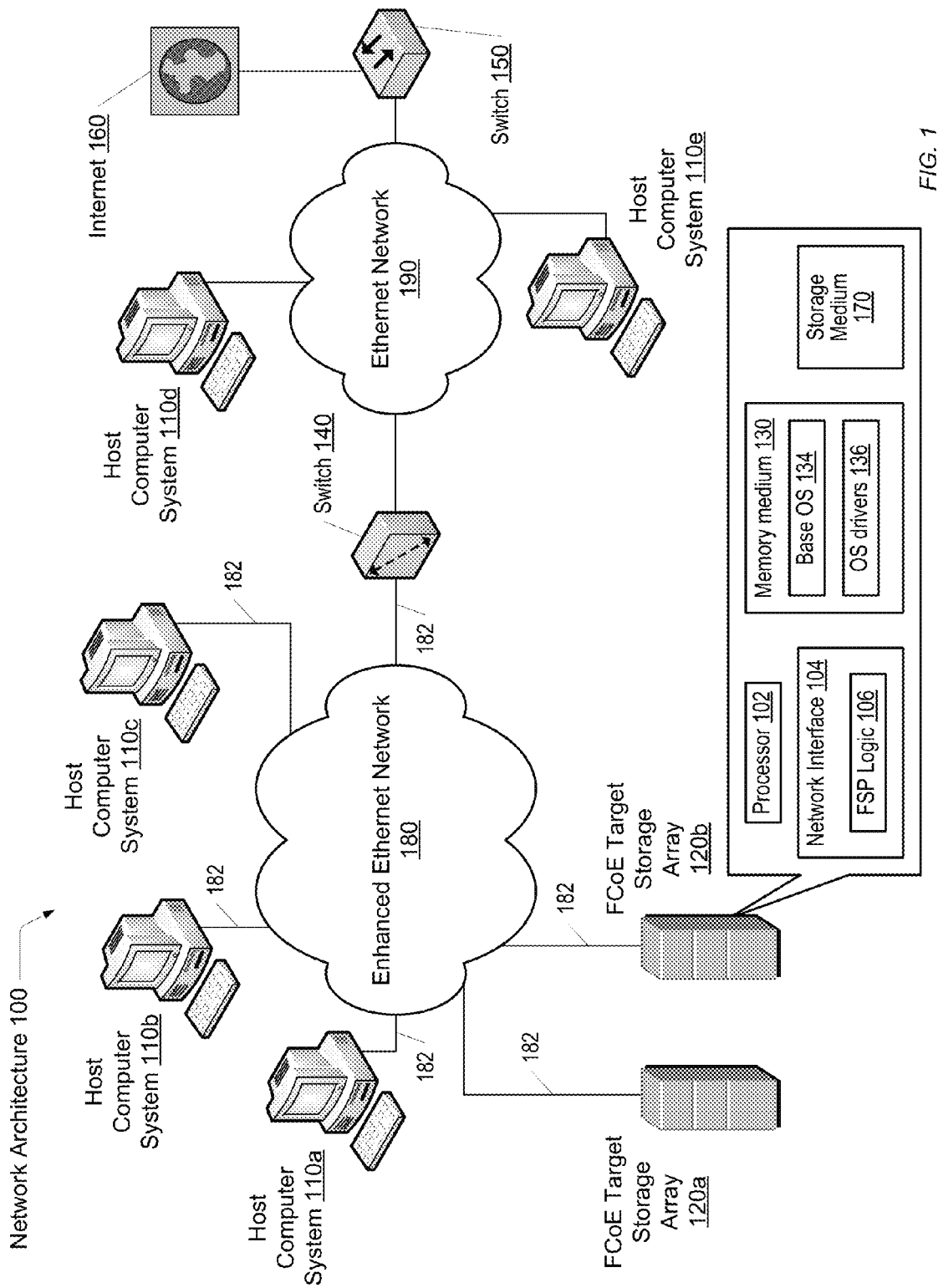
FIG. 1 is a generalized block diagram illustrating one embodiment of network architecture.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Referring to FIG. 1, one embodiment of network architecture 100 is shown. Network architecture 100 includes host computer systems 110a-110c interconnected through an enhanced Ethernet (EE) network 180 to one another and to Fibre Channel over Ethernet (FCoE) target storage arrays 120a-120b. Network 180 may be coupled to an Ethernet network 190 through an Ethernet switch 140. Host computer systems 110d-110e are interconnected through the Ethernet network 190. Network 190 may be coupled to the Internet 160 or other outside network through switch 150. The Ethernet network 190 may interface with a set of communications protocols used for the Internet 160 such as the Transmission Control Protocol (TCP) and the Internet Protocol (IP), or TCP/IP. Switch 150 may be a TCP/IP switch.

Each of host computers 110a-110c and Fibre Channel over Ethernet (FCoE) target storage arrays 120a-120b may be coupled to Enhanced Ethernet network 180 via Ethernet links 182. The Ethernet links 182 support the encapsulation of Fibre Channel (FC) frames, or packets, over Enhanced Ethernet networks. The FCoE protocol may maintain the same latency, security, and traffic management attributes of a FC protocol while preserving any investments by a business in FC tools, training, and storage area networks (SANs). The FCoE protocol recognizes the FC protocol as a vital storage network protocol in a data center while simultaneously providing customers an interface to the Internet and other outside networks. The FCoE protocol avoids creating another, separate protocol for interfacing to the Internet and other outside networks. One example of an FCoE protocol specification is the Fibre Channel Backbone—5 (FC-BB-5) specification. This specification was developed by the technical standards group T11 (X3T9.3), which is a part of the InterNational Committee for Information Technology Standards (INCITS), see American National Standard INCITS, Fibre Channel Backbone—5 (FC-BB-5), Rev 2.00, Jun. 4, 2009.

Before FCoE packets may be transmitted between initiators and targets, the FCoE protocol utilizes an FCoE initialization protocol (FIP) to establish virtual links between the initiators and the targets. Examples of the initiators and the targets include the host computers 110a-110c as initiators and the FCoE target storage arrays 120a-120b as the targets. Typically, the target of the FCoE initialization protocol is an FCoE switch. One type of an FCoE switch is a FCF Forwarder (FCF), which is an Ethernet switch able to also operate as a Fibre Channel switch. However, in the network architecture shown in FIG. 1, no FCoE switch of any kind is used in a path including an FCoE target storage array. Therefore, the targets described herein are the FCoE target storage arrays 120a-120b. The FCoE initialization protocol comprises a discovery phase and a login phase. However, in one embodiment, a FIP discovery phase is not used in network architecture 100. A FIP login phase is used in network architecture 100, but with some minor changes that do not cause changes in the FCoE protocol. Such changes may include each one of the target storage arrays 120a-120b being the only target storage array in a corresponding virtual local area network (VLAN). Therefore, a VLAN identifier (ID) of a given one of the target storage arrays 120a-120b is unique among all of the target storage arrays 120a-120b. In such an embodiment, these VLANs may be used to divide a fabric into multiple virtual fabrics, wherein each one of these virtual fabrics comprises only one target storage array. Therefore, each one of the host computers 110a-110c is configured to perform a login procedure to one and only one target inside a virtual fabric. In addition, each one of the host computers 110a-110c is able to issue multiple logins to multiple target storage arrays.

Another change includes each one of the target storage arrays 120a-120b assigns a node port (N_Port) identifier (ID) to a particular one of the host computers 110a-110c. During a login procedure, which is further described below, a 48-bit fabric provided media access control (MAC) address may be used as a 48-bit Ethernet MAC address used in network architecture 100 to uniquely identify a virtual link between a given one of the host computers 110a-110c and a particular one of the target storage arrays 120a-120b. In the prior art, this 48-bit Ethernet MAC address comprises a 24-bit Fibre Channel Mapped Address Prefix (FC-MAP) and a 24-bit Fibre Channel identifier (FC ID). This 24-bit FC ID may also be referred to as an N_Port ID when discussing establishing a link between a host computer and a target storage array. In network architecture 100, the 24-bit FC-MAP value is chosen to be different from a value of an FC-MAP used by any FCFs that may be present in the network. In the prior art, the 24-bit N_Port ID comprises an 8-bit domain ID, an 8-bit Area ID, and an 8-bit Port ID. However, in network architecture 100 the 24-bit N_Port ID includes a 12-bit virtual local area network ID (VLAN ID) corresponding to a particular one of the target storage arrays 120a-120b. In addition, the 24-bit FC ID includes a unique 12-bit Host ID generated by the particular one of the target storage arrays 120a-120b. The particular one of the target storage arrays 120a-120b assigns the 24-bit N_Port ID and conveys this value to a corresponding one of the host computers 110a-110c during a login procedure.

Each of Fibre Channel over Ethernet (FCoE) target storage arrays 120a-120b may be used for the sharing of data among different servers, such as host computers 110a-110e, in the network architecture 100. In addition, the FCoE target storage arrays 120a-120b may be used for disk mirroring, backup and restore, archival and retrieval of archived data, and data migration from one storage device to another. As used herein, an FCoE target storage array may be referred to as an FCoE target. Each of the FCoE targets 120a-120b includes a storage medium 170 for data storage. Storage medium 170 may comprise FC disk drives. These FC disk drives may provide data storage services to host computers 110a-110e. The base OS 134 and other software stored in memory medium 130 may provide the functionality of file systems, the access to files, and the management of these functionalities. These FC disk drives in storage medium 170 may include one or more hard disks, often arranged into logical, redundant storage containers or RAID arrays (redundant arrays of inexpensive/independent disks). Alternatively, the FC disk drives in storage medium 170 may include non-RAID drive architectures such as a JBOD (just a bunch of disks).

Each of FCoE targets 120a-120b may use a network interface 104 to connect to FCoE links 182. In one embodiment, the functionality of network interface 104 may be included on a network adapter card. The functionality of network interface 104 may be implemented using both hardware and software. Both a random-access memory (RAM) and a read-only memory (ROM) may be included on a network card implementation of network interface 104. One or more application specific integrated circuits (ASICs) may be used to provide the functionality of network interface 104.

The network interface 104 may include FCoE Storage Proxy (FSP) logic 106 to execute one or more steps during a FC login procedure. In addition, the FSP logic 106 may be used to perform a conversion of a packet between two different network protocols such as the FCoE protocol utilized on an Enhanced Ethernet network and the Fibre Channel protocol utilized on storage medium 170.

Packet protocol conversion performed in FSP logic 106 may comprise encapsulation and decapsulation of the packet. For example, the network interface 104 may receive an FCoE packet from the FCoE link 182. Then the FSP logic 106 may be used to decapsulate the FCoE packet. The FSP logic 106 may access one or more operating system (OS) drivers 136 for processing a FC frame that was encapsulated in the received FCoE packet and passing corresponding information to the storage medium 170. The base OS 134 and the OS drivers 136 may comprise program instructions stored on the memory medium 130 and executable by processor 102 to perform one or more memory access operations in storage medium 170 that correspond to the received packet. In one embodiment, the base OS 134 may be a storage operating system such as NetApp Data ONTAP® or other. In other embodiments, the base OS 134 may be representative of any of a variety of specific operating systems, such as, for example, MS-DOS®, MS-WINDOWS®, OS/2®, UNIX®, Linux®, Solaris® or another known operating system.

In order to send an FCoE packet, the network interface 104 may be used to create a FC packet with a data payload from the storage medium 170. For example, data for a read operation may be prepared to be sent across the network via FCoE links 182 to a corresponding host computer. The FSP logic 106 may be used to encapsulate the FC packet in an FCoE packet to be sent on FCoE link 182.

As mentioned earlier, the FSP logic 106 may also be used to perform the steps included in a FIP login procedure. Typically in a Fibre Channel (FC) infrastructure, when a FC device is connected to a FC switch, the FC device attempts to perform a FC fabric login (FLOGI). Again, here, in network architecture 100, there is no FC switch in a path including one of the FCoE targets 120a-120b as a data storage destination. However, in order to maintain the FC infrastructure, such as for storage medium 170, an established login procedure is performed.

Typically, FCoE packets are built using a media access control (MAC) address that is unique within the boundaries of a local Ethernet sub-network, such as EE network 180. This locally unique MAC address is conventionally assigned by an FCF as part of the FC initialization protocol (FIP) that establishes virtual links. This FIP process is the FC fabric login (FLOGI). In the network architecture 100 shown in FIG. 1, no FCF or FCoE switch is used in a path including one of the FCoE targets 120a-120b as a data storage destination. Therefore, no MAC address assigned by a FCF is used in the FIP login procedure.

Instead, the FSP logic 106 conveys a unique FC ID during the FIP login procedure to an initiating host computer. The FSP logic 106 may generate unique numbers as part of the FC ID value in order to differentiate between multiple host computers that login to the corresponding FCoE target. A counter or a random number generator may be used to generate a Host ID value. In one embodiment, each of the VLAN ID and the Host ID is a 12-bit value. Different FCoE targets, such as 120a-120b are located in different VLANs. Each FCoE target uses the ID of the VLAN that it is in as part of the FC ID to be assigned to the initiating host computer. The VLAN ID and the Host ID (e.g., a concatenation, or some other combination, of the VLAN ID and Host ID in one embodiment) may be used instead of the 24-bit FC ID assigned by a FCF in the conventional FIP login procedure. A 24-bit FC ID assigned by a FCF comprises an 8-bit domain ID, an 8-bit Area ID, and an 8-bit Port ID. The 24-bit FC ID is used by the FCF to locate a target storage array. Again, there are no FCFs in a path in the network architecture 100 that includes one of the FCoE targets 120a-120b as a data storage destination. Therefore, the FCoE target supplies a 24-bit value during a FIP login procedure, rather than relying on a switch to perform the login or to provide the FC ID value. The FC protocol and messages for the FIP login procedure may otherwise remain the same in network architecture 100. However, a fabric-provided media access control (MAC) address is provided by an FCoE target, rather than a switch. The FCoE target includes the newly defined FC ID in the MAC address.

Further, during the FIP login procedure, the FSP logic 106 may use a Fibre Channel Mapped Address Prefix (FC-MAP) value different from the value of the FC-MAP used by FCFs in the network. This FC-MAP value is also a 24-bit value. The concatenation of the 24-bit FC-MAP value with the 24-bit FC ID (or 12-bit VLAN ID and 12-bit number) produces a 48-bit fabric-provided MAC address (FPMA). The 48 bit FPMA value is described in the FC-BB-5 specification. After the FIP login procedure and the establishment of virtual links, the 48-bit FPMA value is used within FCoE packets transmitted across FCoE links 182. The FC-BB-5 specification defines a range of 256 FC-MAP values to facilitate FCoE deployments. The 256 different FC-MAP values provide 256 available pools of locally unique MAC addresses. As described earlier, the 24-bit FC ID distinguishes initiating host computers from one another that share a particular one of the FCoE targets 120a-120b as a data storage destination. Since each of the FCoE target is located in a different VLAN, the use of the 12-bit VLAN ID in the FC ID distinguishes the FC IDs assigned by each of the FCoE targets 120a-120b from one another. The 24-bit FC-MAP value which is different from the FC-MAP value used by FCFs may be used to distinguish the FPMAs assigned by each of the FCoE targets 120a-120b from any existing FCFs in network architecture 100. Although network architecture 100 does not require the use of any FCoE switches or FCFs in paths that include one of the FCoE targets 120a-120b as a data storage destination, there may be FCFs in the network. However, the 48-bit FPMA may be a unique address used to identify a particular one of the FCoE targets 120a-120b. This unique FPMA may be included in subsequent FCoE packets sent from a corresponding host computer to the FCoE target.

A further description of the other components in network architecture 100 is now provided. In one embodiment, host computers 110a-110c may be FCoE hosts or initiators. Each of host computers 110a-110c may be coupled to Enhanced Ethernet (EE) network 180 via FCoE links 182. Each host computer 110a-110c may comprise a Converged Network Adapter (CNA) to couple to FCoE links 182. Utilizing only Ethernet switches and FCoE links within the EE network 180, each of host computers 110a-110c may be coupled to one or more FCoE target storage arrays 120a-120b without the use of any (FCoE) Forwarders (FCFs). An FCF may also be referred to as an FCoE switch. Accordingly, there are no FCoE switches in any path between each of the host computers 110a-110c and each of the FCoE target storage arrays

120a-120b. In addition, each of host computers 110a-110c may be configured to perform a FC initialization protocol (FIP) process that includes sending packets, or frames, that adhere to the FIP process as described above.

In one embodiment, each of host computers 110a-110c may skip a virtual local area network (VLAN) discovery step of the FIP process. Rather, host computers 110a-110c may access a predetermined storage location, such as a location within a name server (not shown), to determine host-to-target assignments and corresponding VLAN identifiers (IDs) that are assigned during a previous configuration step. Afterward, each of host computers 110a-110c may perform a separate FIP login procedure directly with each FCoE target storage array that is assigned to it.

After completion of the FIP login procedures, transmission of FCoE packets between one of the host computers 110a-110c and an assigned one of the FCoE targets 120a-120b may occur. Encapsulation and decapsulation of these FCoE packets may occur within a host computer and within an FCoE target storage array, such as in FSP logic 106. Encapsulation and decapsulation of these FCoE packets may not occur during transit before a host computer or an FCoE target storage array receives it.

Host computers 110a-110e are representative of any number of stationary or mobile computers such as desktop personal computers (PCs), workstations, laptops, handheld computers, servers, personal digital assistants (PDAs), smart phones, and so forth. Generally speaking, host computers 110a-110e include one or more processors comprising one or more processor cores. Each processor core includes circuitry for executing instructions according to a predefined general-purpose instruction set. For example, the x86 instruction set architecture may be selected. Alternatively, the Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a hard disk drive.

Each processor core and memory hierarchy within a host computer may be in turn connected to a network interface. In one embodiment, the network interface may comprise a Converged Network Adapter (CNA) to couple to FCoE links 182. In addition to hardware components, each of host computers 110a-110c may include a base operating system (OS) stored within the memory hierarchy, such as a hard disk drive. The base OS may be representative of any of a variety of specific operating systems, such as, for example, MS-DOS®, MS-WINDOWS®, OS/2®, UNIX®, Linux®, Solaris® or another known operating system. As such, the base OS may be operable to provide various services to the end-user and provide a software framework operable to support the execution of various programs. Additionally, each of host computers 110a-110c may include a hypervisor used to support higher-level virtual machines (VMs). As is well known to those skilled in the art, virtualization may be used in desktops and servers to fully or partially decouple software, such as an OS, from a system's hardware. Virtualization may provide an end-user with an illusion of multiple OSes running on a same machine each having its own resources.

The Ethernet links 182 may be used within the Enhanced Ethernet (EE) network 180. The Ethernet links 182 and the EE network 180 provide the ability for the FCoE protocol to transport FC traffic over an Enhanced Ethernet infrastructure. Classical Ethernet has no per priority flow control, which is unlike the Fibre Channel network. For this reason, the FCoE protocol utilizes enhancements to the Ethernet standard in order to support a per priority flow control mechanism. Flow control mechanisms help prevent congestion and ensuing frame loss. The EE network 180 supports the IEEE 802.1Qbb Priority-based Based Flow Control functionality. For example, one provided enhancement in EE network 180 is a Per Priority PAUSE functionality, which makes traffic lossless, or prevents the dropping of frames.

Classical Ethernet network 190 may include a variety of techniques including wireless connection, direct local area network (LAN) connections, one or more routers, switches, repeaters, grids, and/or others. Ethernet switch 140 may be used to couple networks 180 and 190 to one another. Switch 150 may utilize transmission control protocol/internet protocol (TCP/IP) hardware and/or software to couple Ethernet network 190 to a wide area network (WAN) connection such as the Internet 160.

It is noted in alternative embodiments, the number and type of host computers and servers, switches, networks and storage devices is not limited to those shown in FIG. 1. At various times one or more clients may operate offline. In addition, during operation, individual host computer connection types may change as users connect, disconnect, and reconnect to network architecture 100. Further, although components in FIG. 1 are described without (FCoE) Forwarders (FCFs) in network architecture 100, alternative embodiments may include FCFs. However, these FCFs are not utilized in any path between an FCoE target storage array and a host computer. Rather, these FCoE paths utilize other features to overcome a lack of FCFs as described below.

Figure 2:
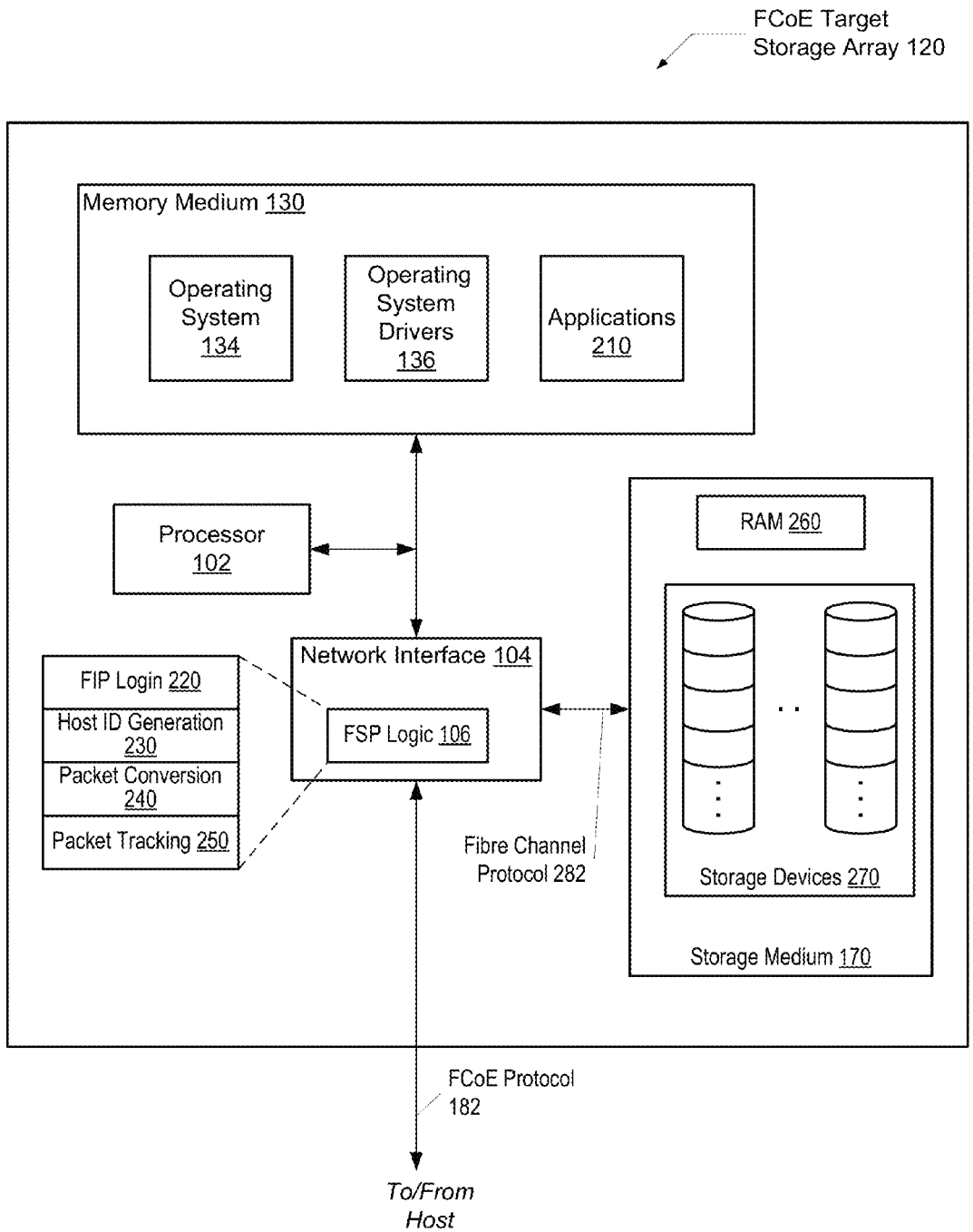
FIG. 2 is a generalized block diagram of one embodiment of a Fibre Channel over Ethernet (FCoE) target storage array.

Turning now to FIG. 2, a generalized block diagram of one embodiment of a Fibre Channel over Ethernet (FCoE) target storage array 120 is shown. Hardware and software components that correspond to those of FIG. 1 are numbered identically. As described above, FCoE target storage array 120, or FCoE target 120, includes a processor 102 coupled to memory medium 130. Processor 102 and memory medium 130 are in turn connected to network interface 104. Memory medium 130 comprises a base OS 134, one or more OS drivers 136, and one or more other software applications 210. It is noted that the depicted software components may be paged in and out of a main memory in a conventional manner from a storage medium such as a hard drive (not shown).

Storage medium 170 is coupled to network interface 104. Storage medium 170 may comprise a random access memory (RAM) 260 for temporary storage of data being transferred between network interface 104 and storage devices 270. In one embodiment, RAM 260 may include non-volatile RAM (NVRAM). The transfer of data may be through a Fibre Channel (FC) link 282. FCoE target 120 may use block storage consolidation.

Storage devices 270 may include disk storage arranged in a RAID layout, a JBOD layout, or other. In one embodiment, multiple RAID groups form an "aggregate" in storage devices 270 and the OS 134 may sets up "flexible volumes" to actually store data that users can access. An alternative is "traditional volumes" where one or more RAID groups form a single static volume. Flexible volumes may allow the creation of several volumes on a single aggregate and allow resizing of the volumes at any time. Smaller volumes may then share all of the spindles available to the underlying aggregate. Traditional volumes and aggregates may only be expanded and not contracted. However, traditional volumes may handle higher input/output (I/O) throughput than flexible volumes with a same number of spindles. The higher throughput of traditional volumes may be due to traditional volumes do not have to go through an additional virtualization layer to talk to the underlying disk. Configurations may be performed with the OS 134, which may be a storage operating system such as NetApp Data ONTAP® or other.

As discussed earlier, the FCoE Storage Proxy (FSP) logic 106 may be used during a Fibre Channel initialization protocol (FIP) login procedure and during packet handling procedures. The functionality of the FSP logic 106 may be implemented in hardware such as ASICs, in software, or both. The FSP logic 106 may comprise at least logic components FIP Login 220, Host ID Generation 230, Packet Conversion 240 and Packet Tracking 250. The FIP Login logic 220 may be used to decode and execute received FIP login messages from an initiating host computer.

In response to the received FIP login messages, the FIP Login logic 220 may form the 48-bit fabric-provided MAC address (FPMA) described above. The FIP Login logic 220 may concatenate the 24-bit Fibre Channel Mapped Address Prefix (FC-MAP) to a corresponding 12-bit VLAN ID and a 12-bit Host ID. The 24-bit FC-MAP value may be set during a previous configuration process. For example, an IT administrator may use a software application to generate or set the value during configuration. Configuration may occur when one or more sub-networks in network architecture 100 are being brought online. The 12-bit Host ID may be generated by Host ID Generation logic 230. A counter, a random number generator, or other means may be used to produce a unique Host ID value within the FCoE target storage array. The Packet Conversion logic 240 may perform FCoE packet encapsulation and decapsulation. The Packet Tracking logic 250 may maintain a table in order to identify a host computer as a source of a given received FCoE packet. Any response FCoE packet may then be conveyed with corresponding data to the identified host computer.

Figure 3:
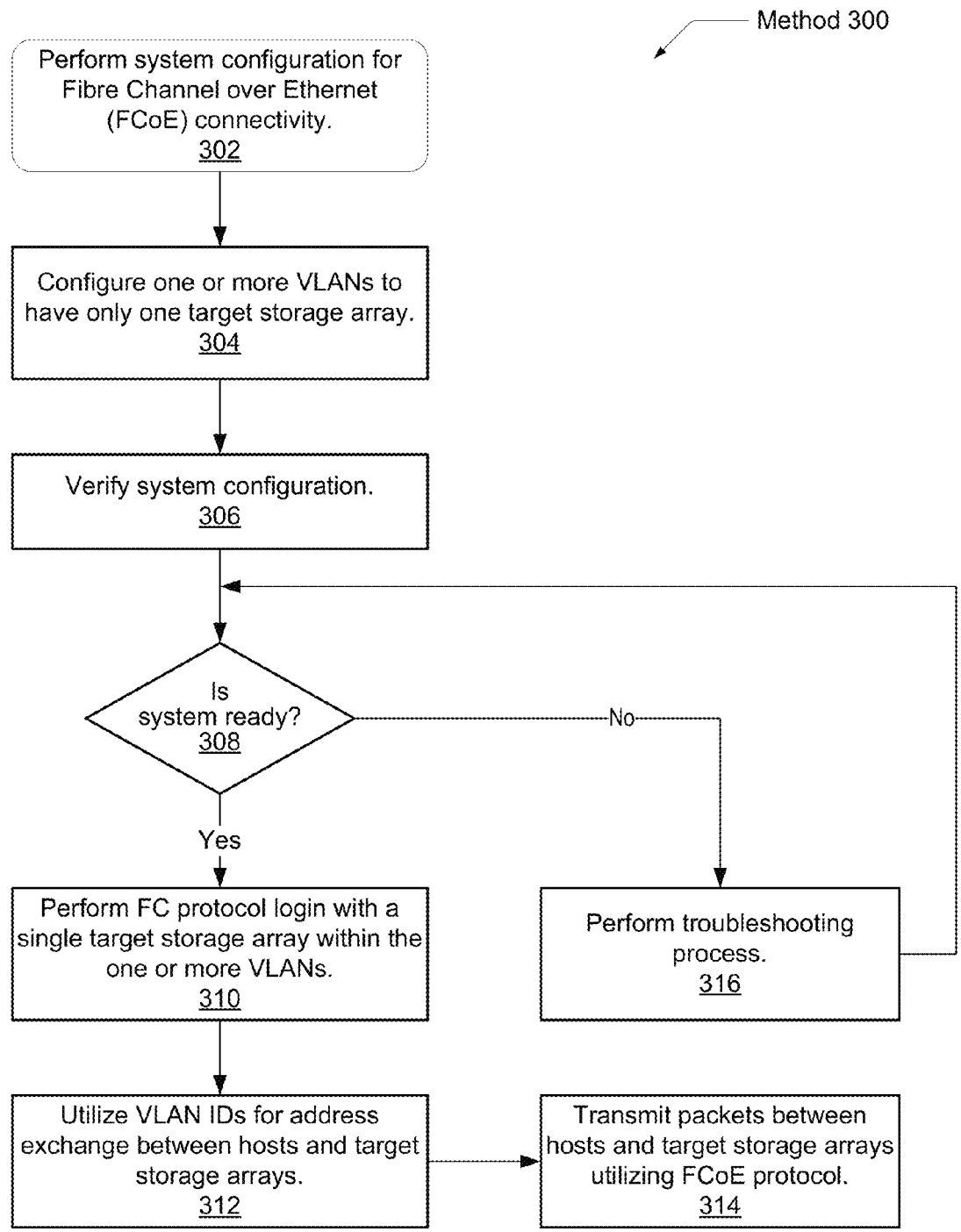
FIG. 3 is a generalized flow diagram illustrating one embodiment of a method for transmitting packets over two different network protocols without protocol conversion in any switches.

Referring now to FIG. 3, one embodiment of a method 300 for transmitting packets over two different network protocols without protocol conversion in any switches is shown. The components embodied in network architecture 100 and FCoE target storage array 120 described above may generally operate in accordance with method 300. For purposes of discussion, the steps in this embodiment are shown in sequential order. However, some steps may occur in a different order than shown, some steps may be performed concurrently, some steps may be combined with other steps, and some steps may be absent in another embodiment.

In block 302, a configuration of one or more sub-networks in network architecture is set for Fibre Channel over Ethernet (FCoE) connectivity. In one embodiment, the network architecture may be used to define a data center for a business. The configuration of the hardware and software components in the network architecture may support multiple types of data center traffic. Using a management interface, such as a command-line interface or a graphical user interface (GUI), an IT administrator may verify that the fabric interconnect of at least one sub-network supports lossless transport for the FCoE traffic. One or more Ethernet networking switches may be verified to support the Converged Enhanced Ethernet (CEE) functionality that provides lossless transport for the FCoE traffic.

In block 304, using the same management interface, the IT administrator identifies all system components. In addition, the IT administrator configures one or more VLANs to have only one FCoE target storage array. From a FCoE perspective, a separate VLAN is used for each FC VSAN. Since each of these VLANs represent a different VSAN, the FC standard allows an initiator to perform a separate FLOGI in each of these VLANs. Therefore, an initiator that already adheres to the FC-BB-5 standard may maintain an end-to-end connection with multiple FCoE targets located in different VLANs.

In block 306, a system verification process is executed. Again, the IT administrator may use the management interface to execute commands to perform this step. If one or more errors occur that prevent the system from being ready (conditional block 308), then in block 316, the IT administrator performs a troubleshooting process. If the system is ready (conditional block 308), then in block 310, an initiator may perform a FIP login in a VLAN comprising a single FCoE target. In response to the FIP login from the initiator, the FCoE target utilizes its corresponding VLAN ID and a generated Host ID in a response FIP packet in block 312. In block 314, after the FIP login procedure is completed, FCoE packets may be transmitted between the initiator and the FCoE target across an Enhanced Ethernet network. These FCoE packets may utilize the VLAN ID and the Host ID within an Ethernet destination MAC address.

Figure 4:
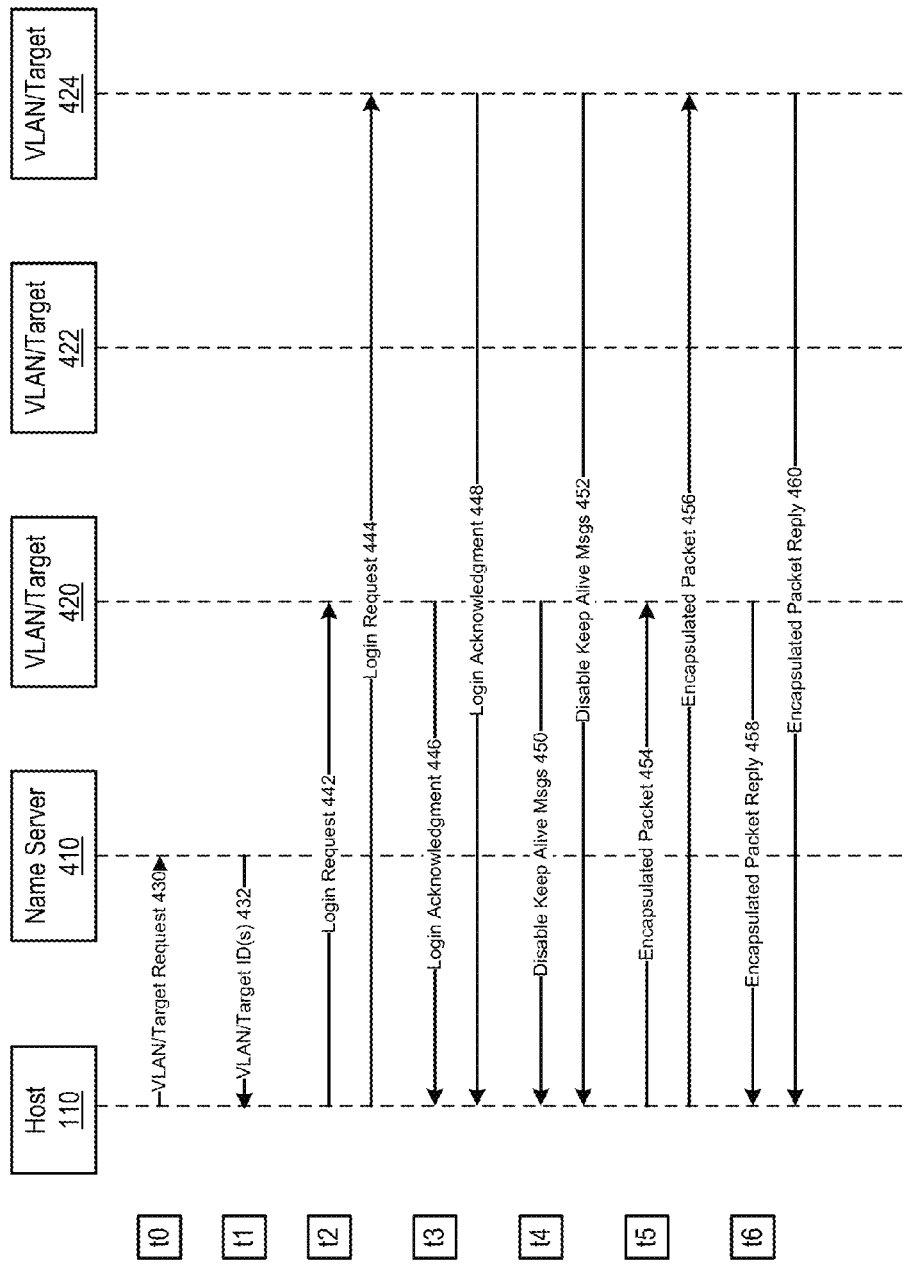
FIG. 4 is generalized sequences diagram illustrating one embodiment of a FIP login followed by the transmission of FCoE packets without protocol conversion in any switches.

Turning now to FIG. 4, a sequences diagram illustrating one embodiment of a FIP login followed by the transmission of FCoE packets without protocol conversion in any switches is shown. The components embodied in network architecture 100 and FCoE target storage array 120 described above may generally operate in accordance with the sequence diagram. The sequences diagram illustrates one embodiment of a given host computer issuing multiple logins to multiple FCoE targets. In response to a login request from the host computer, each FCoE target assigns an N_Port ID to the host computer that comprises a corresponding VLAN ID and a generated unique host ID. In the illustrated embodiment, a host computer 110 is configured as an FCoE initiator that adheres to the FC-BB-5 standard. For example, the host computer 110 may comprise a Converged Network Adapter (CNA) to couple to FCoE links. The host computer 110 is shown accessing a name server 410 with message 430 at time t0 to obtain configured assignments. These assignments may have been performed in a previous configuration step and stored in a predetermined location within the name server 410. At a later time t1, the name server 410 may provide one or more VLAN IDs in a reply message 432. The included one or more VLAN IDs correspond to VLANs assigned to the particular host computer 110. In the example shown, the particular host computer 110 may be assigned to VLANs 420 and 424. VLAN 422 may be assigned to one or more other host computers. In addition, VLANs 420 and 424 may be assigned to one or more other host computers other than the shown host computer 110. Each of VLANs 420-424 comprises only one FCoE target.

In one embodiment, the FC protocol allows for node port (N_Port) ID virtualization (NPIV). This NPIV capability allows multiple N_Port IDs to share a single physical N_Port. In addition, this NPIV capability allows multiple Fibre Channel initiators to occupy a single physical port, which may ease hardware requirements in Storage Area Network design. After identifying VLANs assigned to it at time t1, the host computer 110 may begin a FIP login procedure by sending login request messages 442 and 444 at time t2.

After receiving the login request messages 442 and 444, each of the FCoE targets within the VLANs 420 and 424 prepare a response FIP packet. In this response packet, each of the FCoE targets may insert a corresponding VLAN ID and a generated Host ID as described earlier. The login acknowledgment messages 446 and 448, which are shown to be sent at time t3, may comprise these two ID values. Virtual links and a communication protocol may be established between the host computer 110 and the VLANs 420 and 424 upon the receipt of messages 446 and 448 at the host computer 110.

Shown at time t4, messages 450 and 452 are sent from the FCoE targets within VLANs 420 and 424 to the host computer 110. The messages 450 and 452 may be configured to disable the host computer 110 from sending a repeating polling signal. This repeating polling signal may correspond to a Fibre Channel over Ethernet (FCoE) Initialization Protocol (FIP) Keep Alive (FKA) message. In the FC-BB-5 standard, the status of an FCoE switch, such as an FCoE forwarder (FCF), may be critical since it is the central point between initiators and FCoE targets. However, in the network architecture 100, there is no FCoE switch in a path including one of the FCoE targets 120a-120b as a data storage destination. In one embodiment, the FCoE targets in VLANs 420 and 424 may set the "D" bit in a Discovery Advertisement (DA) in order to disable the host computer 110 from sending FIP Keep Alive messages. In one embodiment, since the VN_Port (initiator) may still check for DAs even when the "D" bit is set to "1", in order to avoid causing problems to existing initiators, each FSP may still send out DAs periodically.

At time t5, the host computer 110 may utilize the established end-to-end communication with the single FCoE targets within VLANs 420 and 424. For example, the host computer 110 may send an encapsulated FCoE packet to these VLANs in messages 454 and 456. The FCoE packets may encapsulate native Fibre Channel payloads in Ethernet packets. Upon receiving these FCoE packets, each of the FCoE targets within VLANs 420 and 424 may decapsulate these packets to obtain the FC payloads. The FCoE targets may then access included storage devices using the information stored in the FC payloads. If a response is appropriate for the FC payloads, such as a read request, then the FCoE targets may build a FC packet that is encapsulated in an Ethernet packet. Next, at time t6, the FCoE targets may transmit these encapsulated packets in messages 458 and 460 across FCoE links to the host computer 110.

Figure 5:
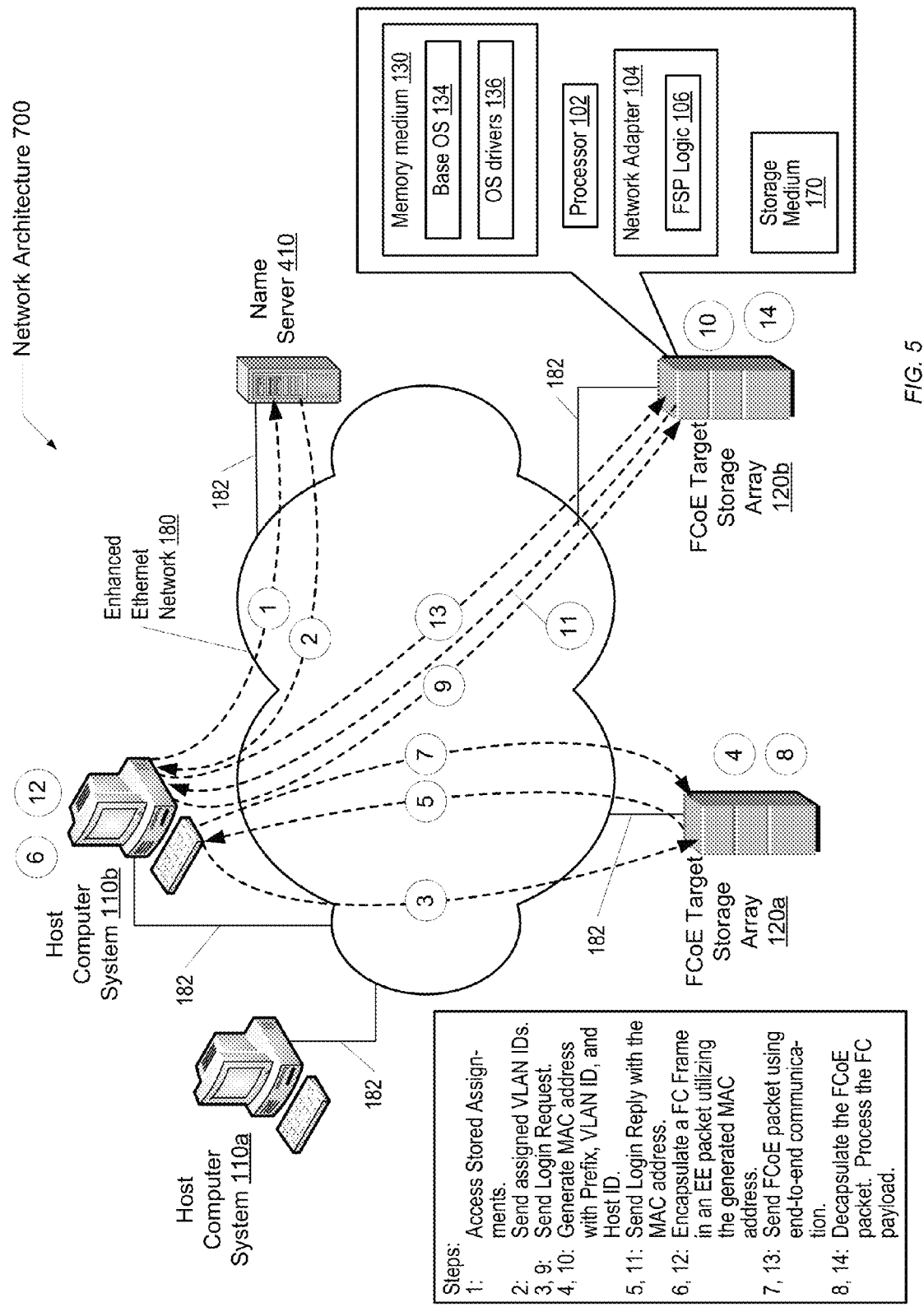
FIG. 5 is generalized sequences diagram illustrating one embodiment of a FIP login followed by the transmission of FCoE packets without protocol conversion in any switches.

Turning now to FIG. 5, a sequences diagram illustrating another embodiment of a FIP login followed by the transmission of FCoE packets without protocol conversion in any switches is shown. As in the example of FIG. 4, the embodiment shown depicts a single host performing multiple logins to different targets in different VLANs. Hardware and software components that correspond to those of FIG. 1 and FIG. 4 are numbered identically. The components embodied in network architecture 100 and 700 and in FCoE target storage array 120 described above may generally operate in accordance with the sequence diagram described in FIG. 4. Here in network architecture 700 another sequences diagram is shown with steps 1 to 14. Similar to time t0 and t1 in FIG. 4, steps 1 and 2 in FIG. 5 include the host computer 110b accessing a name server 410 to obtain configured assignments. These assignments may have been performed in a previous configuration step and stored in a predetermined location within the name server 410. The name server 410 provides one or more VLAN IDs in step 2. For example, the name server 410 may send a VLAN ID corresponding to each of FCoE targets 120a and 120b.

In step 3, the host computer 110b may begin a FIP login procedure by sending a login request to FCoE target 120a. After receiving the login request message, the FCoE target 120a prepares a response FIP packet in step 4. The FCoE target 120a may generate a unique Host ID for host computer 110b. The FCoE target 120a may concatenate its 12-bit VLAN ID value with a 12-bit value corresponding to the generated unique Host ID. This concatenated value may correspond to a 24-bit Fibre Channel (FC) ID value. Then the FCoE target 120a may concatenate a 24-bit Fibre Channel Mapped Address Prefix (FC-MAP) value to this 24-bit FC ID value to form a 48-bit fabric-provided MAC address (FPMA).

In step 5, the FCoE target 120a may send a login acknowledgment messages including the FPMA to the host computer 110b.

In step 6, the host computer 110b may encapsulate a FC frame in an Enhanced Ethernet (EE) packet with FCoE target 120a as the intended target of the packet. This FCoE packet may utilize the FPMA provided by the FCoE target 120a. In steps 7 and 8, the FCoE target 120a receives the FCoE packet transmitted through EE network 180 and decapsulates the packet in order to process the included FC payload. The FPMA included in the FCoE packet is used to route the packet through EE network 180 to FCoE target 120a. Steps 9-14 correspond to steps 3-8 but in regard to FCoE target 120b instead of FCoE target 120a. Although the sequence steps 9-14 are numbered following steps 3-8, steps 9-14 may occur before or concurrently with steps 3-8.

Figure 6:
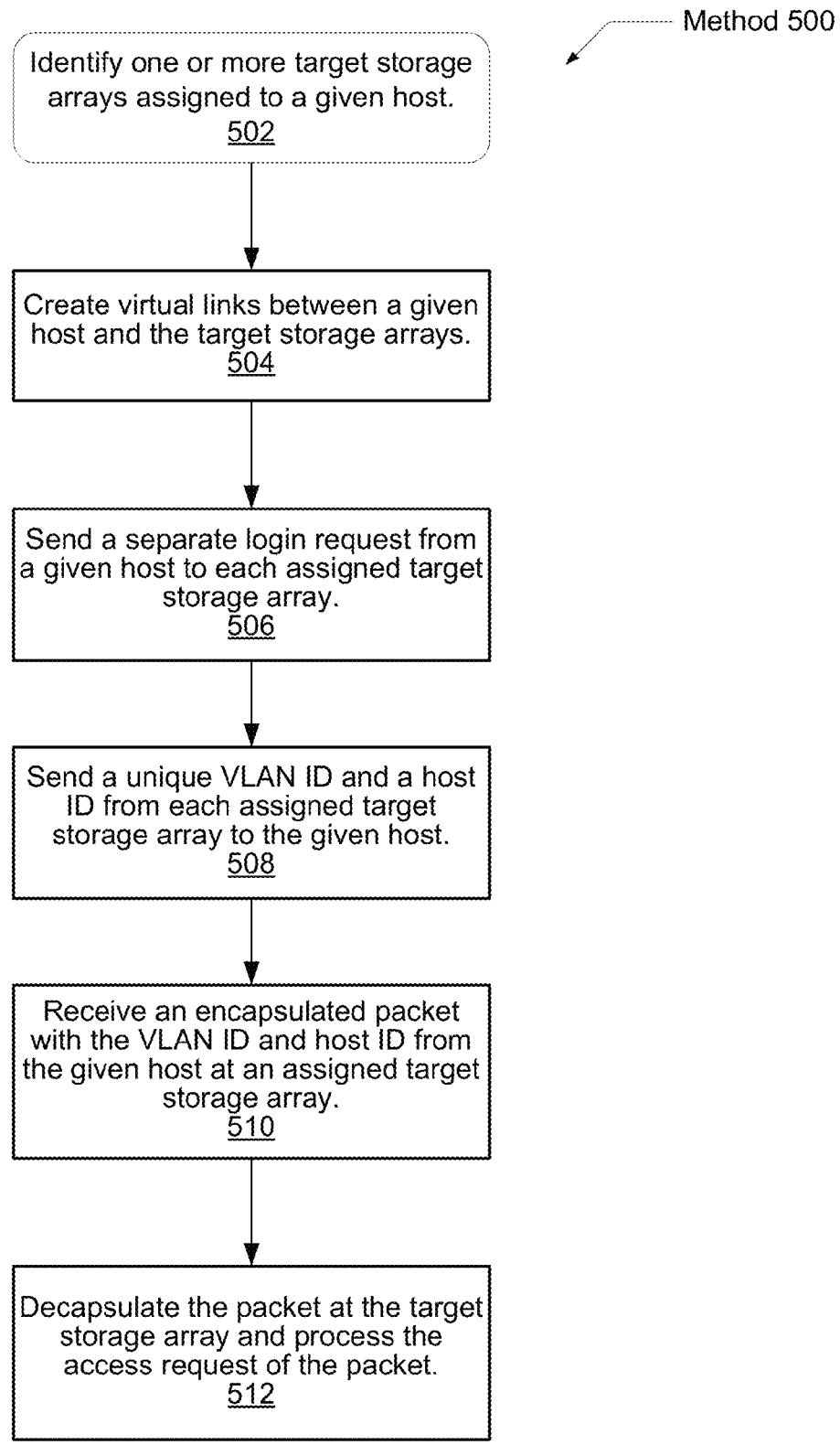
FIG. 6 is a generalized flow diagram illustrating one embodiment of a method for transmitting FCoE packets without protocol conversion in any switches.

Referring now to FIG. 6, one embodiment of a method 500 for transmitting FCoE packets without protocol conversion in any switches is shown. The components embodied in network architecture 100 and FCoE target storage array 120 described above may generally operate in accordance with method 500. Similar to the sequence diagram shown in FIG. 4, method 500 may expand further upon steps 310-314 of method 300. For purposes of discussion, the steps in this embodiment are shown in sequential order. However, some steps may occur in a different order than shown, some steps may be performed concurrently, some steps may be combined with other steps, and some steps may be absent in another embodiment.

In block 502, a given host computer configured to be an FCoE initiator identifies one or more FCoE targets assigned to it. In one embodiment, the host computer accesses a predetermined storage location to obtain configured assignments. The assignments may have been made in a previous system configuration operation. For example, an IT administrator utilizing a command-line or GUI management interface may have set up the assignments. In one embodiment, the IT administrator may have stored the assignments in a predetermined storage location in a name server. The host computer may receive one or more VLAN IDs corresponding to the FCoE targets that are assigned to the host computer.

In order to maintain a FC protocol where only one fabric login is allowed per fabric, each VLAN configured to have an FCoE target may be set up to have only one FCoE target. Therefore, the host computer may have a separate end-to-end communication with each of the FCoE targets, wherein the end-to-end communication is configured during a separate FIP login procedure. For example, a virtual link may be set up after completing the FIP login procedure. In block 504, a separate virtual link between the host computer and a particular FCoE target is established. For example, one or more FIP packets may be sent between the host computer and the particular FCoE target according to the Fibre Channel protocol. In block 506, the host computer may initiate a FIP login procedure. In block 508, the particular FCoE target may respond by conveying a VLAN ID and a generated Host ID to the host computer. These ID values may be used in FCoE packets that are later transmitted between the host computer and the particular FCoE target.

In block 510, the host computer may encapsulate native Fibre Channel payloads in Ethernet packets and directly send these FCoE packets to the assigned FCoE targets. No FCoE switches may be used in the end-to-end communication. In block 512, upon receiving an FCoE packet, a given FCoE target may decapsulate the packet to obtain the FC payload/frame. Using the information stored in the FC payload, the FCoE target may then access included storage devices (e.g., read or write operation). If a response is appropriate for the FC payload, such as a read request, then the FCoE targets may build a FC packet that is encapsulated in an Ethernet packet. Next, the FCoE target may transmit the FCoE packet across established FCoE links to the host computer.

Figure 7:
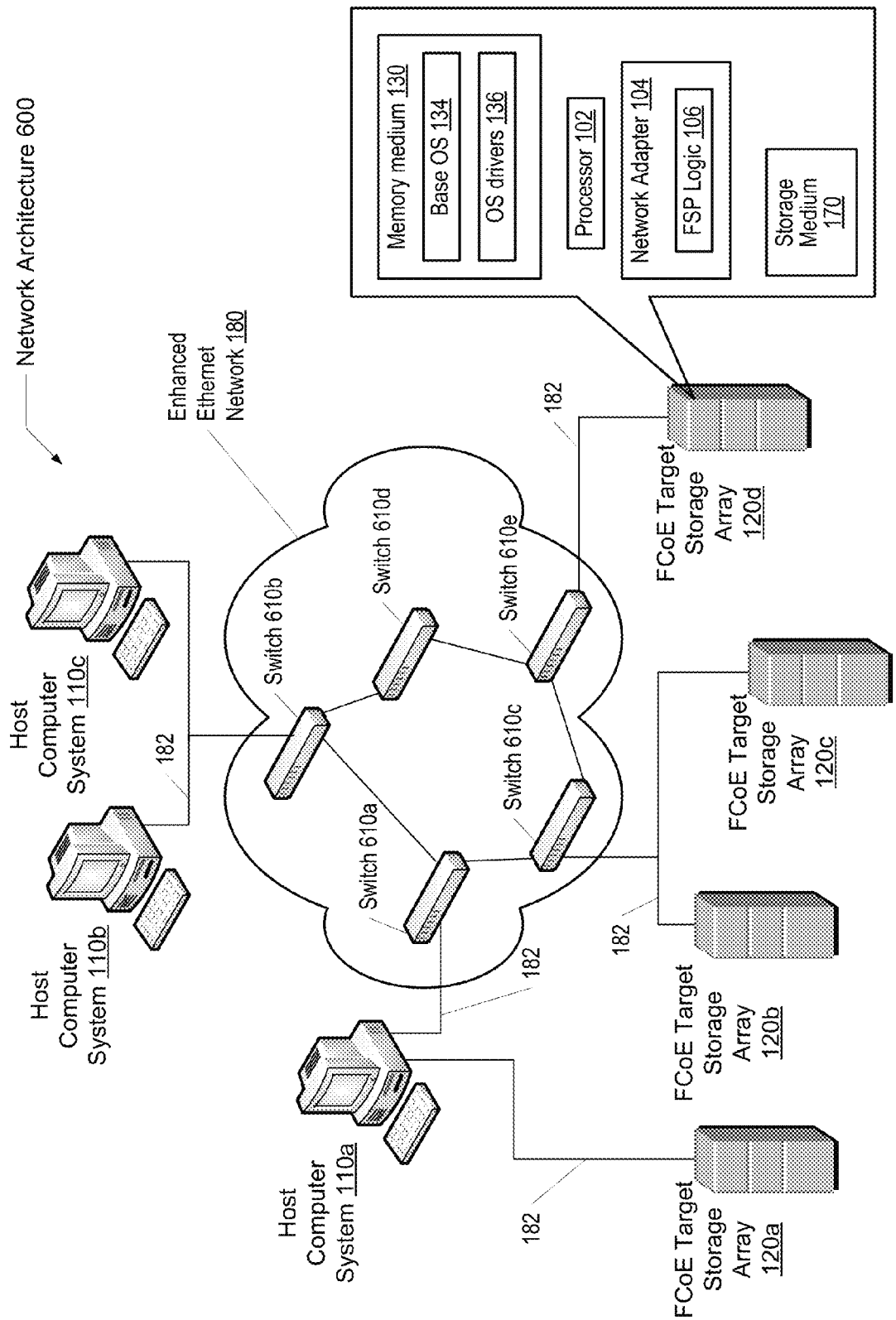
FIG. 7 is a generalized block diagram illustrating another embodiment of network architecture.

Referring to FIG. 7, one embodiment of network architecture 600 is shown. Hardware and software components that correspond to those of FIG. 1 are numbered identically. The components embodied in network architecture 600 may generally operate as described above for the components of network architecture 100. Network architecture 600 includes host computer systems 110a-110c interconnected through an Enhanced Ethernet (EE) network 180 to one another and to Fibre Channel over Ethernet (FCoE) target storage arrays 120a-120d. The EE network 180 comprises EE switches 610a-610e that allow lossless Ethernet connections. The EE network 180 does not comprise an FCoE switch. Rather, an end-to-end communication may be implemented as described above between a given one of the host computers 110a-110c and a given one of the FCoE target storage arrays 120a-120d. The end-to-end communication described earlier allows FCoE initiators to connect to native FCoE targets without any FCF bottleneck. In addition, this end-to-end communication does not affect current FCoE initiators that are currently deployed that adhere to the existing FC-BB-5 standard.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
one or more host computers, configured to send and receive packets according to a Fibre Channel over Ethernet (FCoE) network protocol;
one or more target storage arrays, configured to communicate with the one or more host computers using the FCoE network protocol, wherein each target storage array is included in a virtual local area network (VLAN) with one of the host computers;
wherein each of the one or more host computers is configured to:
identify one or more VLANs of which the host computer is a member, wherein each VLAN is uniquely identified by a VLAN ID and includes just one of the target storage arrays; and
send a separate login message to the target storage array in each of the identified VLANs;
wherein each of the one or more target storage arrays is configured to:
send a node port (N_Port) ID to the host computer in the VLAN comprising a host ID and the VLAN ID in response to receiving a login message from the given host computer, wherein the host ID uniquely identifies the host computer in the VLAN; extract Fibre Channel (FC) frames from received FCoE packets; and encapsulate FC frames in FCoE packets;
wherein the VLAN is established between the host computer and the target storage array without an FCoE Forwarder (FCF) or an FCoE switch.

2. The system as recited in claim 1, wherein the extracted FC frames identify a read or write memory operation to be performed within a target storage array receiving the FCoE packets.

3. The system as recited in claim 2, wherein FCoE packets conveyed in the system include the VLAN ID and the host ID.

4. The system as recited in claim 3, wherein packets conveyed between a particular host and a target include a VLAN ID and a host ID which identify the particular host.

5. The system as recited in claim 3, wherein each of the one or more target storage arrays is further configured to disable a host computer from sending a polling signal, wherein the polling signal corresponds to a FCoE Keep Alive (FKA) message.

6. The system as recited in claim 1, wherein each of the one or more target storage arrays is further configured to generate the unique host ID by utilizing at least one of the following: a random number generator and a counter.

7. The system as recited in claim 3, wherein each of the one or more target storage arrays is further configured to send a FC Mapped Address Prefix (FC-MAP) to the given host computer, in response to receiving a login message from the given host computer, wherein the FC-MAP is included in the Ethernet source and destination MAC addresses.

8. The system as recited in claim 3, wherein each of the one or more host computers is further configured to access a predetermined storage location to identify the one or more target storage arrays assigned to the host computer.

9. A method comprising:
for each of one or more host computers configured to send and receive packets according to a Fibre Channel over Ethernet (FCoE) network protocol:
identifying one or more virtual local area network (VLANs) of which one of the host computers is a member, wherein each VLAN is uniquely identified by a VLAN ID and includes just one of the target storage arrays; and
sending a separate login message to a target storage array in each of the identified VLANs, wherein each target storage array is included in VLAN with the host computer;
for each of the one or more target storage arrays:
sending a node port (N_Port) ID to the host computer in the VLAN comprising a host ID and the VLAN ID, in response to receiving a login message from the given host computer, wherein the host ID uniquely identifies the host computer in the VLAN;

extracting Fibre Channel (FC) frames from received FCoE packets; and encapsulating FC frames in FCoE packets;

wherein an FCoE Forwarder (FCF) or an FCoE switch is absent in an end-to-end communication between each of the one or more host computers and the only target storage array.

10. The method as recited in claim 9, the extracted FC frames identify a read or write memory operation to be performed within a target storage array receiving the FCoE packets.

11. The method as recited in claim 10, wherein said packets include the VLAN ID and the host ID.

12. The method as recited in claim 11, wherein packets conveyed between a particular host and a target include a VLAN ID and host ID which identify the particular host.

13. The method as recited in claim 11, further comprising disabling a host computer from sending a polling signal, wherein the polling signal corresponds to a FCoE Keep Alive (FKA) message.

14. The method as recited in claim 12, further comprising generating the unique host ID by utilizing at least one of the following: a random number generator and a counter.

15. The method as recited in claim 11, further comprising sending a FC Mapped Address Prefix (FC-MAP) to the given host computer, in response to receiving a login message from the given host computer, wherein the FC-MAP is included in the Ethernet source and destination MAC addresses.

16. The method as recited in claim 11, further comprising accessing a predetermined storage location to identify the one or more target storage arrays assigned to the host computer.

17. A network adapter card included in a target storage array, wherein the target storage array is included in a virtual local area network (VLAN) with one host computer, the network adapter card comprising:

one or more application specific integrated circuits (ASICs) configured to:

receive a login message from the host computer, wherein the target storage array is configured to communicate with the host computer according to a Fibre Channel over Ethernet (FCoE) network protocol;

send a node port (N_Port) ID to the host computer comprising a host ID and a VLAN ID that uniquely identifies each VLAN, in response to receiving the login message from the host computer, wherein the host ID uniquely identifies the host computer in the VLAN, wherein each VLAN includes just one of the target storage arrays;

extract Fibre Channel (FC) frames from received FCoE packets; and encapsulate FC frames in FCoE packets;

wherein an FCoE Forwarder (FCF) or an FCoE switch is absent in an end-to-end communication between the host computer and the target storage array.

18. The network adapter card as recited in claim 17, wherein the extracted FC frames identify a read or write memory operation to be performed within a target storage array receiving the FCoE packets.

19. The network adapter card as recited in claim 18, wherein FCoE packets conveyed in the system include the VLAN ID and the host ID.

20. The network adapter card as recited in claim 19, wherein packets conveyed between a particular host and a target include a VLAN ID and host ID which identify the particular host.

* * * * *